Patented Aug. 31, 1943

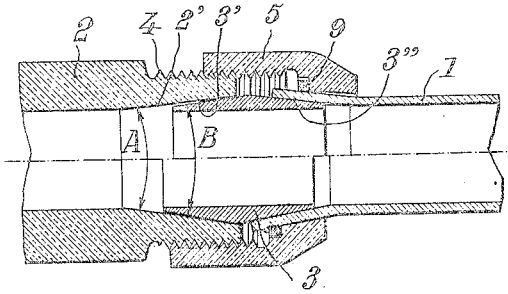
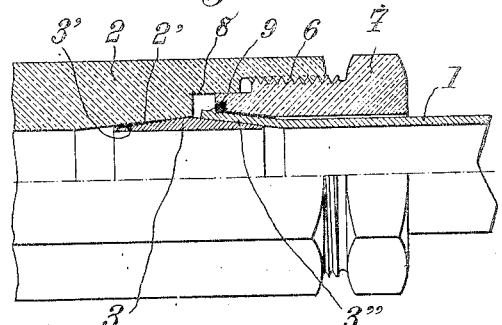
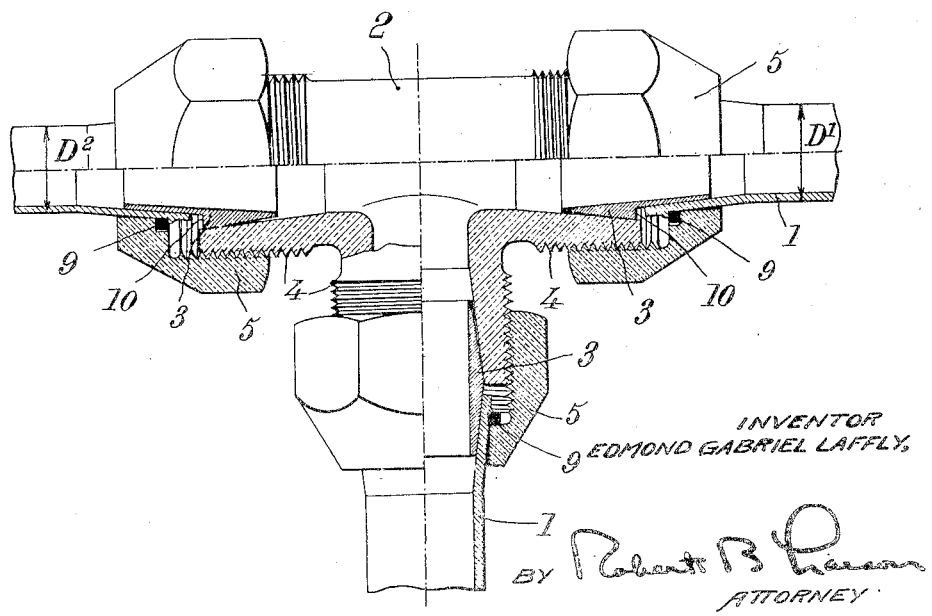

2,328,469

UNITED STATES PATENT OFFICE 2,328,469

COUPLING DEVICE

Edmond Gabriel Laffly, Paris, France; vested in the Alien Property Custodian

Application February 3, 1942, Serial No. 429,428
In France September 4, 1941

3 Claims. (Cl. 285—86)

The present invention relates to coupling devices for use between a pipe and a tubular part, the expression "tubular part" designating, in the present case, any element with which a pipe may have to be coupled, such for instance as a socket rigid with a tank, a cock, or any connecting device (T-piece union, cross-shaped union, elbow union, and so on), these coupling devices being of the type in which fluidtightness is ensured by tight engagement on one another of conical surfaces, or, in a general manner, of surfaces having oblique generatrices.

The chief object of the present invention is to provide a coupling device of this type which is better adapted to meet the requirements of practice than those used for the same purpose up to the present time, and in particular simpler to manufacture.

According to an essential feature of the present invention, a coupling device of the type above referred to involves the provision, in the tubular part, of a conical bore and includes, between the pipe and said bore, a ring having two contact surfaces one of which, of frusto-conical shape, is adapted to engage in said conical bore, while the other is adapted to fit, in a fluidtight manner, in the end of the pipe.

Other features of the present invention will result from the following detailed description of some specific embodiments thereof.

Preferred embodiments of the present invention will be hereinafter described, with reference to the accompanying drawing, given merely by way of example, and in which:

Fig. 1 is a sectional view showing the general arrangement of a device, made according to a first embodiment of the invention, for coupling together a pipe and a tubular part, the upper part of this showing the device before tightening and the lower part after tightening thereof;

Fig. 2 shows, in part section, a device analogous to that of Fig. 1 but made according to another embodiment of the invention;

Fig. 3 shows, in part section, a device, also made according to the present invention, for coupling, with a T-piece union, three pipes of different respective sections.

In the following description, it will be assumed that it is desired, to assemble together, in a fluidtight manner, a pipe 1 and a tubular part 2 constituted for instance by the spout of a cock or a vessel.

According to the invention, tubular part 2 is provided with a conical bore 2' having an apex angle A averaging from 10 to 15°.

The coupling device includes a bi-conical ring 3, preferably made of a metal harder than that of the tubular part, for instance made of steel if the tubular part is of bronze.

This ring 3 includes two frusto-conical surfaces 3' and 3''.

Surface 3' having an apex angle B slightly greater than apex angle A (for instance with a difference ranging from 30' to 1°) is adapted to engage wholly in conical bore 2'.

Surface 3'', having any desired apex angle, is adapted to engage in the end of pipe 1, which has been previously slightly widened for this purpose.

Finally, means are provided for having this ring 3 tightly held between the parts to be assembled together, to wit pipe 1 and tubular part 2.

These tightening means may be made as follows:

In the embodiment of Fig. 1, tubular part 2 is screw-threaded at 4, on the outside, and a female nut 5 is screwed on said threads, this nut being so shaped as to bear against the flaring end of pipe 1.

In the embodiment of Fig. 2, tubular part 2 is internally screw-threaded at 6, and a male nut 7 is screwed in said threads, this nut being in this case also, adapted to bear tightly against the flaring end of pipe 1.

In last described embodiment (Fig. 2) the inner wall of tubular part 2 includes successively (starting from the edge thereof) first threads 6, then a sliding adjustment zone 8, and finally conical bore 2'.

Of course, the manner in which the nut (either 5 or 7) bears against the flaring end of pipe 1 is not limited to any particular arrangement. However, it is advantageous to have recourse to the arrangement set forth in my prior patent application Ser. No. 403,856, filed July 24, 1941 according to which, between the nut and the end of the pipe, there is interposed a ring such as 9 adapted, at the end of the tightening, to penetrate slightly into the matter of which the pipe is made.

A coupling device of the kind above described will work as follows:

At the beginning of the tightening operation, ring 3 contacts, through its part of larger diameter, against the inner wall of bore 2', along a circumference (see the upper part of Fig. 3).

In the course of the nut tightening operation, ring 3 penetrates slightly, through the edge along which frusto-conical portions 3' and 3'' are joined together, into the matter of tubular part 2, and contact is ensured along a small frusto-conical surface over which the whole of the tightening stress is distributed.

In this way I obtain a perfect contact and leakage is impossible.

Such a device has very considerable advantages over the prior known devices and especially over those in which the male cone (which may be considered as corresponding to frusto-conical surface 3'') on which the end of the pipe is applied is formed in the tubular part itself. It will be readily understood that it is much simpler to machine the pieces in the case of a device made according to the present invention than in that of the prior devices, and especially in the case of devices having an inner cone.

Furthermore, owing to the slight difference provided between apex angles A and B, perfect fluidtightness is obtained without special precautions being necessary, whereas, when these angles are equal, fluidtightness can be obtained only after a long and difficult grinding.

Finally, the invention is particularly well adapted to the use of standard elements for obtaining assembly between pipes 1 and tubular parts 2 of different sections.

This is due to the fact that I may, according to the invention, make use of a bi-conical ring 3 the inner section of which, instead of being uniform varies from one end to the other. For instance, as shown by Fig. 3 (couplings at the ends of the horizontal part of the T), the inner wall of ring 3, instead of being cylindrical, is conical. In this case, the frusto-conical outer portions 3' and 3'' of the ring, instead of being joined to each other directly, along a common circular base, are joined to each other along an intermediate surface 10, for instance plane and perpendicular to the axis of the ring.

It is thus possible to fit, on the same tubular part, or on a plurality of tubular parts of the same diameter, carried for instance by a single piece, pipes of different diameters.

An example of this, corresponding to the case of a T-piece union, is shown by Fig. 3, where three tubular parts of the same diameter are coupled on the one hand with a pipe of a diameter D and, on the other hand, with two pipes of smaller diameters $D_1$ and $D_2$.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A coupling device for assembling a pipe with a tubular part which comprises, in combination, the end portion of said tubular part, said end portion forming a flaring bore, a ring having two exterior contact surfaces, one of frusto-conical shape adapted to engage in said bore said frusto-conical portion of said ring having a greater angle of divergence than said second exterior contact surface with respect to the longitudinal axis of said tubular part, the second contact surface being adapted to engage in a fluidtight manner against the end of said pipe, means for forcing said tubular part and said pipe toward each other so as to keep said ring tightly held between them, said frusto-conical surface engaging said bore in a fluid-tight manner and over a narrow zone thereof.

2. A coupling device as defined in claim 1, the diameter of the exterior surface of said first said frusto-conical portion being greater than the diameter of the exterior surface of said second contact surface at their respective apexes.

3. A coupling device before assembling a pipe with a tubular part which comprises, in combination, the end portion of said tubular part, said end portion having a flaring bore, a ring having two exterior contact surfaces, one of frusto-conical shape adapted to engage in said bore, said frusto-conical portion of said ring having a greater angle of divergence than said second contact surface with respect to the longitudinal axis of said tubular part, said second contact surface being adapted to engage in a fluid-tight manner the end of said pipe, means for forcing said tubular part and said pipe toward each other so as to keep said ring tightly held between them, the diameter of said exterior surface of said first frusto-conical portion being greater than the diameter of the exterior surface of said second contact surface at their respective apexes, the interior surface of said ring having the shape of a truncated cone.

EDMOND GABRIEL LAFFLY.